(12) United States Patent
Tebo (10) Patent No.: US 6,488,438 B1
(45) Date of Patent: Dec. 3, 2002

(54) BOARD LEVELING APPARATUS AND METHOD

(76) Inventor: Glenn J. Tebo, P.O. Box 754, Kingston, NH (US) 03848

( * ) Notice: Subject to any disclaimer, the term of this patent is extended or adjusted under 35 U.S.C. 154(b) by 0 days.

(21) Appl. No.: 09/505,302

(22) Filed: Feb. 16, 2000

(51) Int. Cl.[7] .................................................. F16B 12/36
(52) U.S. Cl. ...................... 403/294; 403/281; 403/274; 52/285.4; 52/800.11
(58) Field of Search ................................ 403/274, 279, 403/281, 294, 283, 286; 52/285.4, 800.11, 800.12

(56) References Cited

U.S. PATENT DOCUMENTS

| | | | |
|---|---|---|---|
| 153,280 A | * | 7/1874 | Richards ..................... 403/283 |
| 310,678 A | | 1/1885 | Halstrom |
| 317,304 A | | 5/1885 | Condit, Jr. |
| 327,537 A | | 10/1885 | Dodsworth |
| 642,377 A | | 1/1900 | Smith |
| 712,569 A | | 11/1902 | Myers |
| 847,888 A | | 3/1907 | Birdsall |
| 989,198 A | | 4/1911 | Slayton |
| 1,074,800 A | | 10/1913 | King |
| 1,186,383 A | | 6/1916 | Danly |
| 1,390,918 A | | 7/1921 | McFarland |
| 1,510,360 A | | 9/1924 | Van Rijmenam |
| 2,079,194 A | | 5/1937 | Williams |
| 2,169,433 A | | 8/1939 | Roy |
| 2,199,833 A | | 5/1940 | Fleischman |
| 2,270,284 A | | 1/1942 | Faggard |
| 2,328,867 A | * | 9/1943 | Veteran ...................... 411/458 |
| 2,620,705 A | | 12/1952 | Podvinecz et al. |
| 2,845,103 A | | 7/1958 | Sypher |
| 2,913,042 A | * | 11/1959 | Taylor ........................ 403/283 |
| 2,994,878 A | | 8/1961 | Abrahamsen |
| 3,022,509 A | | 2/1962 | Tjark de Man |
| 3,071,827 A | | 1/1963 | Van Buran, Jr. |
| 3,112,488 A | | 12/1963 | Dettlott et al. |
| 3,331,180 A | | 7/1967 | Vissing et al. |
| 3,373,646 A | | 3/1968 | Ehlert |
| 3,542,273 A | | 11/1970 | Hedrick |
| 3,670,941 A | | 6/1972 | Grinnell et al. |
| 3,693,863 A | | 9/1972 | Black |
| 3,711,008 A | | 1/1973 | Clifford et al. |

(List continued on next page.)

FOREIGN PATENT DOCUMENTS

| | | |
|---|---|---|
| GB | 776390 | 6/1957 |
| IT | 443789 | 1/1949 |

OTHER PUBLICATIONS

International Search Report for PCT/US01/40130.

*Primary Examiner*—Lynne H. Browne
*Assistant Examiner*—Aaron Dunwoody
(74) *Attorney, Agent, or Firm*—Fish & Richardson P.C.

(57) ABSTRACT

A leveling fastener for connecting and aligning boards includes an elongated support member having first and second support portions with first and second coplanar upper surfaces, a connecting portion that extends upward from the support member, and an elongated fastening component that extends from the connecting portion and that has a pointed end that can be driven into a board, thereby securing the leveling fastener to the board. In use, the first coplanar upper surface of the leveling fastener is positioned flush against a first bottom surface of a board, the fastening component is driven into a first side surface of the board, and a second bottom surface of a second board is positioned flush against the second coplanar upper surface of the fastener. Another aspect of the invention relates to the leveling fastener in combination with a device for driving the leveling fastener into a board. The driving device has an alignment structure having an abutment surface on its exterior and a driver slidably connected to a fastener delivery channel defined by the alignment structure.

19 Claims, 6 Drawing Sheets

U.S. PATENT DOCUMENTS

| | | |
|---|---|---|
| 3,741,068 A | 6/1973 | Andemskiewicz |
| 3,813,985 A | 6/1974 | Perkins |
| 3,821,919 A | 7/1974 | Knohl |
| 3,875,648 A | 4/1975 | Bone |
| 3,885,491 A | 5/1975 | Curtis |
| 3,945,293 A | 3/1976 | Krol |
| 3,969,975 A | 7/1976 | Krol |
| 4,126,258 A | 11/1978 | Martin et al. |
| 4,131,975 A | 1/1979 | Niedecker |
| 4,233,878 A * | 11/1980 | McGauran et al. ......... 411/510 |
| 4,907,730 A | 3/1990 | Dion |
| 4,923,350 A | 5/1990 | Hinksman et al. |
| 4,925,141 A | 5/1990 | Classmen |
| 4,949,929 A | 8/1990 | Kesselman et al. |
| 5,027,573 A | 7/1991 | Commins et al. |
| 5,054,678 A | 10/1991 | Nasiatka |
| 5,222,975 A | 6/1993 | Crainich |
| 5,333,979 A | 8/1994 | Raffoni |
| 5,738,473 A | 4/1998 | Tebo |
| 5,997,209 A * | 12/1999 | Sachs ........................ 403/388 |
| 6,071,054 A | 6/2000 | Tebo |

\* cited by examiner

BOARD LEVELING APPARATUS AND METHOD

TECHNICAL FIELD

This invention relates to carpentry, building, and construction, and more particularly to an apparatus and method making a level connection between two or more boards.

BACKGROUND

In various situations in carpentry, building, and construction work, it is necessary to connect boards, so that the respective upper and lower surfaces of adjacent boards are aligned and level. This need arises, for example, in the construction of decks, particularly when joists are spaced 16 inches apart. This operation has been performed with deck clips described in U.S. Pat. No. 5,027,573. However, the clips described therein require additional fasteners, such as nails, for affixation to boards, because the clips themselves only have short "locator prongs." Additional fasteners require additional materials and additional procedures, which make construction work slower and more complicated.

SUMMARY

The invention, in one aspect, relates to a leveling fastener for connecting and aligning boards. The leveling fastener includes an elongated support member, having first and second support portions with first and second coplanar upper surfaces, a connecting portion that extends upward from the support member, and an elongated fastening component that extends from the connecting portion and that has a pointed end that can be driven into a board, thereby securing the leveling fastener to the board.

When connecting boards, the first coplanar upper surface of the leveling fastener is positioned flush against a first bottom surface of a first board, the fastening component is driven into a first side surface of the board, and a second bottom surface of a second board is positioned flush against the second coplanar upper surface of the fastener.

In another aspect, the invention relates to a combination of a leveling fastener and a device for driving the leveling fastener into a board. The driving device has an alignment structure having an abutment surface on its exterior and a driver slidably connected to a fastener delivery channel defined by the alignment structure. A leveling fastener is disposed within the fastener delivery channel so that movement of the driver down the fastener delivery channel can move the fastener from a first position to a second position.

Preferably, the leveling fastener is constructed as a unitary device. It may be constructed of a single piece of material or multiple pieces that are connected together. The leveling fastener can have more than one connecting portion, each of which may have more than one pointed end. The pointed ends may be directed in the same direction, in opposing directions, or in any desired orientation. The connecting portion may have any suitable shape or configuration, for example a pointed prong or a thin plate. Any part of the leveling fastener may have a rough surface (for example, a surface that is jagged, grooved, or barbed), which permits the fasteners to have a more secure connection to boards.

The driving device may also include an alignment plate connected to the alignment structure. The alignment plate may include a cutout portion, thereby permitting any part of the support members that protrude outside the alignment structure to remain in flush contact with a board, throughout the driving operation. Alternately, the alignment plate may be positioned so that it abuts a side of a board opposite the side that is in contact with a support surface of the leveling fastener. The driving device may also include a magazine for retaining a plurality of leveling fasteners, springs for returning the driver to a position for driving subsequent fasteners, after a fastener has been driven.

The force required to activate the driver may be supplied manually, or by a pneumatic, hydraulic, elastic, electrical, electromagnetic, electrostatic, magnetic, combustion, or explosive device. For example, the force may be provided by a hammer blow, gunpowder, a spring, an electric motor, an internal combustion engine, or a compressed air device. The force required to activate the driver may be supplied from an offset orientation, for example, with cams, rollers, or linkages.

Embodiments of the invention may include one or more of the following advantages. Leveling fasteners may be constructed as a single, unitary piece and may be connected to boards without the need for additional devices to hold the fastener in place (for example, nails, screws, adhesives). Unitary leveling fasteners are easy to use. The invention may reduce workers' time and labor in building, construction, and carpentry work. Leveling fasteners according to the invention can be securely attached to boards. Leveling fasteners may employ rough surfaces to make connections to boards more secure. Leveling fasteners may employ multiple connecting portions or multiple pointed members for making secure attachments to boards. The invention can be used to align, stiffen, and/or level boards that are connected together. Leveling fasteners can be installed easily with a driving device or gun. Leveling fasteners may be made from materials that have any cross-sectional shape, including round or rectangular cross-sections. Leveling fasteners may be made from any suitable material, including metal, plastic, fiberglass, and carbon fiber. Leveling fasteners may be made, for example, from wire or stamping metal. Leveling fasteners may be manufactured in any suitable manner, for example they may be molded, cast, cut, machined, and/or bent. Leveling fasteners may have any suitable overall size. The invention may be used to connect boards without nails or other fasteners that protrude through the exposed upper surfaces of the boards, as in a deck. The invention may be used with boards of wood, foam, plastic, fiberglass, or any suitable material.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
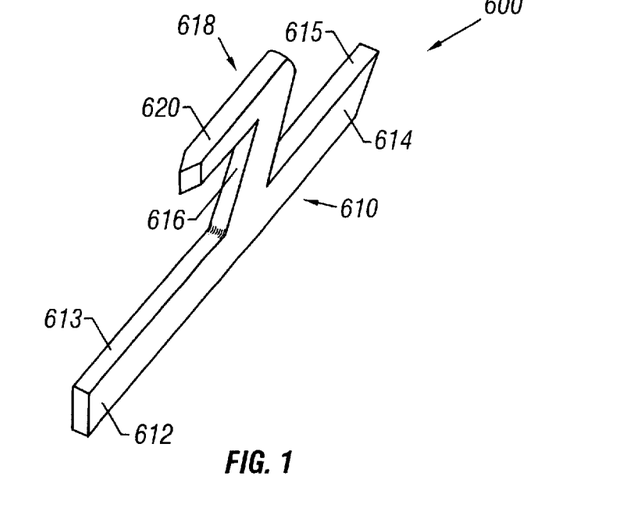
FIG. 1 is a perspective view of a leveling fastener.
Figure 2:
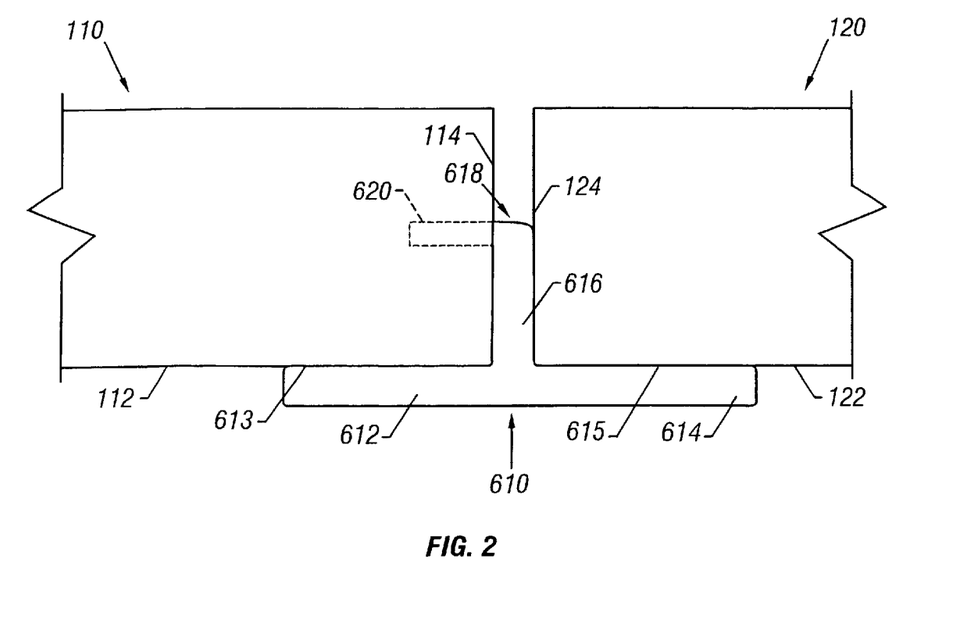
FIG. 2 is a side view of the leveling fastener of FIG. 1 connecting two boards.

Referring to FIGS. 1–2 there is shown leveling fastener 600 having support member 610 with first support portion 612 and second support portion 614, a connecting portion 616 that extends upward from support member 610 to fastening component 618, which is elongated and is generally parallel to support member 610. Fastening component 618 has forward-facing pointed prong 620. Forward-facing prong 620 has a pointed end and an elongated shaft portion that is sufficient to hold fastener 600 securely in a board without the need for any other fastening structure. FIG. 2 shows the leveling fastener in use for making a leveling connection between first board 110 and second board 120. First support surface 613 of first support portion 612 is flush against first contact surface 112 of first board 110 and prong 620 (in phantom) is driven through first end surface 114 of first board 110. Second support surface 615 of second support portion 614 is flush against second contact surface 122 of second board 120.

Figure 3:
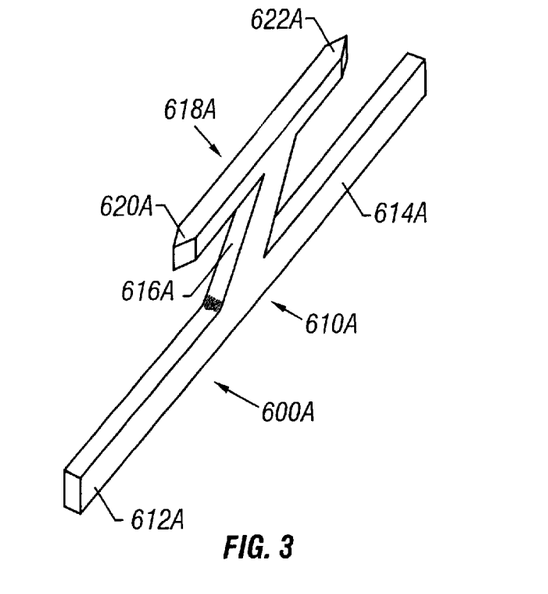
FIG. 3 is a perspective view of a leveling fastener.

Leveling fasteners may also be designed to be attached to boards on either side of the fastener. For example, referring to FIG. 3 there is shown leveling fastener 600A having support member 610A with first support portion 612A, second support portion 614A, and connecting portion 616A that extends upward from support member 610A to fastening component 618A, which is elongated and is approximately parallel to support member 610A. Fastening component 618A has forward-facing pointed prong 620A and rearward-facing pointed prong 622A. In use, rearward-facing prong 622A could be driven into a board that is set against second support portion 614A. For example, rearward-facing prong 622A could be driven into second end surface 124 of second board 120, shown in FIG. 2, by hammering board 120 against prong 622A, after prong 620A has been driven into first board 110.

Leveling fasteners may be designed to have only one pointed prong, or to have any desired number of pointed prongs, which may be oriented for driving into the same board or into different boards, and at any suitable angle.

Preferably, the height of leveling fasteners (for example, the distance from the bottom of support member to the top of fastening component 618) is from ¼ inch to 3 inches and the length of support portions (for example either first support portion 612 or second support portion 614) is from ¼ inch to 3 inches. Preferably, the pointed prongs (for example, forward-facing pointed prong 620) are from ¼ inch to 3 inches long and have a cross-sectional thickness of from 1/16 inch to ½ inch. Leveling fasteners may also employ a variety of pointed elements on fastening components, in addition to prongs, and may employ simultaneously various types of pointed elements, each of which may have any desired dimensions.

Figure 4:
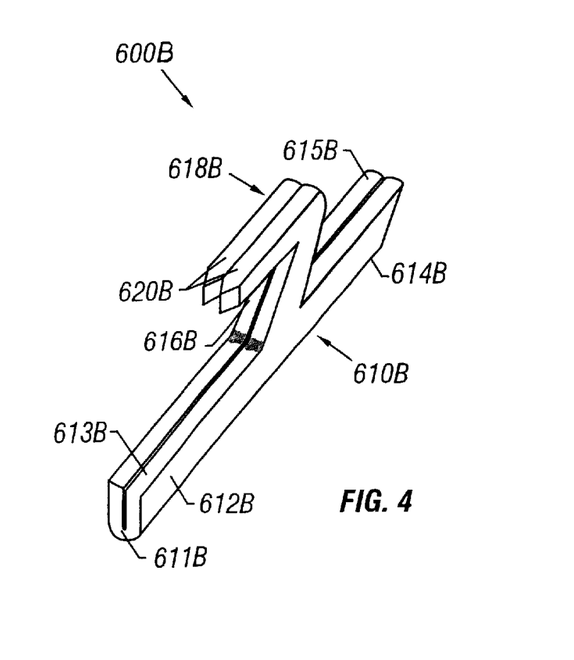
FIG. 4 is a perspective view of a leveling fastener.
Figure 5:
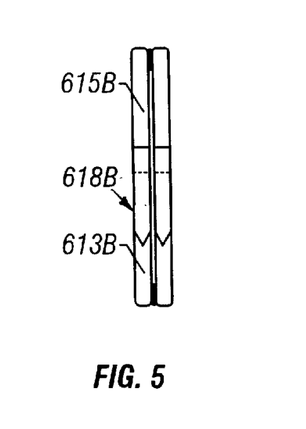
FIG. 5 is a top view of the leveling fastener of FIG. 4.
Figure 6:
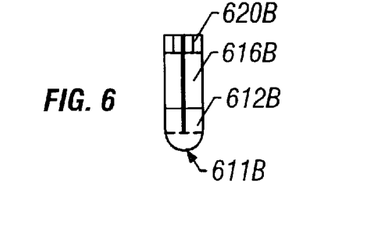
FIG. 6 is a front view of the leveling fastener of FIG. 4.

Referring to FIGS. 4–6, there is shown leveling fastener 600B, which is made of stamping metal that has been cut and then bent in half along fold 611B. Fastening component 618B has two forward-facing pointed prongs 620B, which enhance the attachment of leveling fastener 600B to boards.

Leveling fasteners may be used with a driving device for driving the fasteners into boards. FIGS. 7–10 show driving devices for use with leveling fasteners similar to those shown in FIGS. 4–6, although any of the leveling fasteners described herein may be used with driving devices. Driving devices may be used to make construction, building, and carpentry work more easy and efficient. For example, driving devices for driving two-pointed staples into a deck board and a joist below it are described in my U.S. patent application Ser. No. 00/137,012, filed Aug. 20, 1998, which is incorporated herein by reference.

Figure 7:
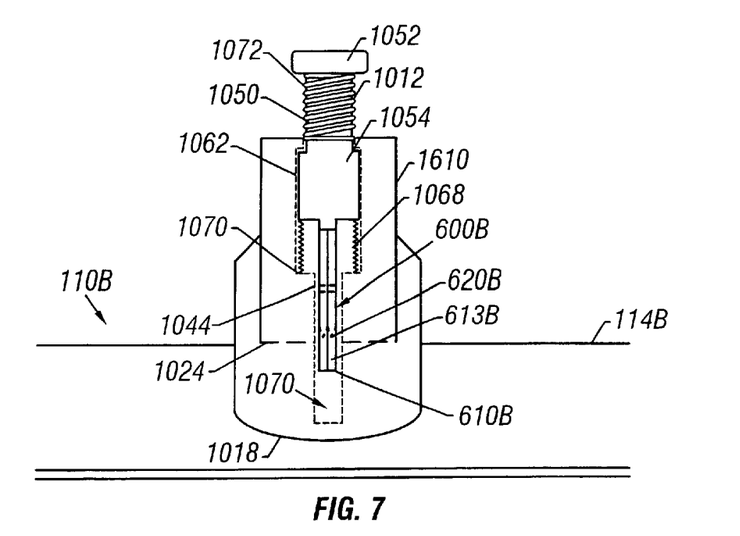
FIG. 7 is a bottom horizontal sectional view of a driving device.
Figure 8:
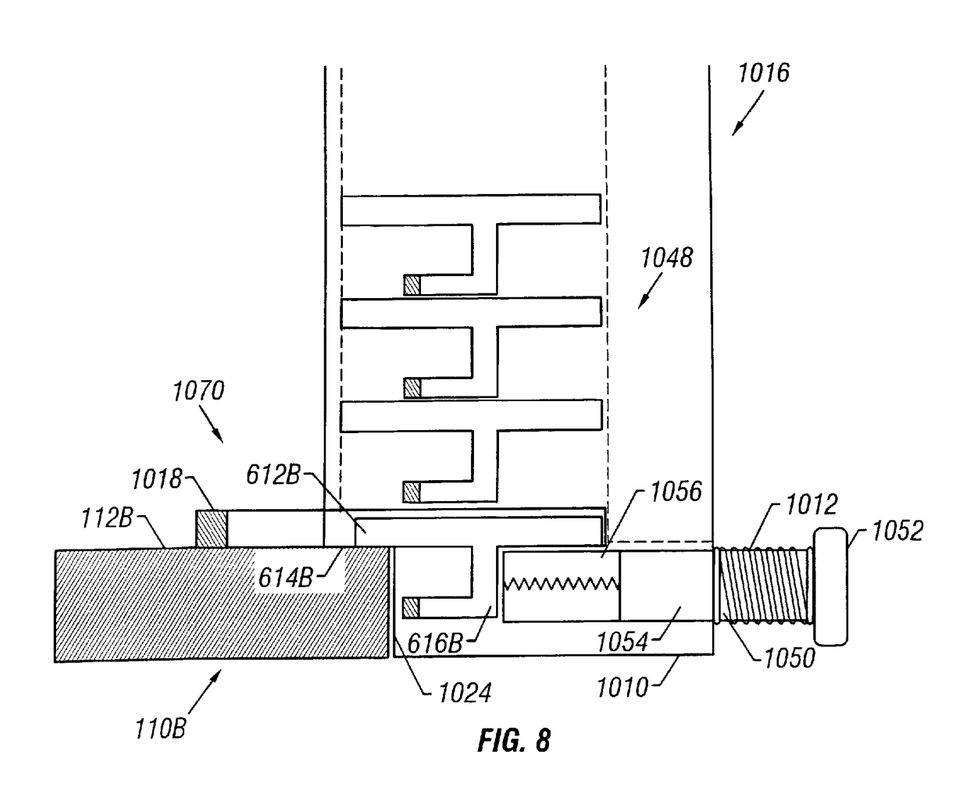
FIG. 8. is a side vertical sectional view of the driving device of FIG. 7.
Figure 9:
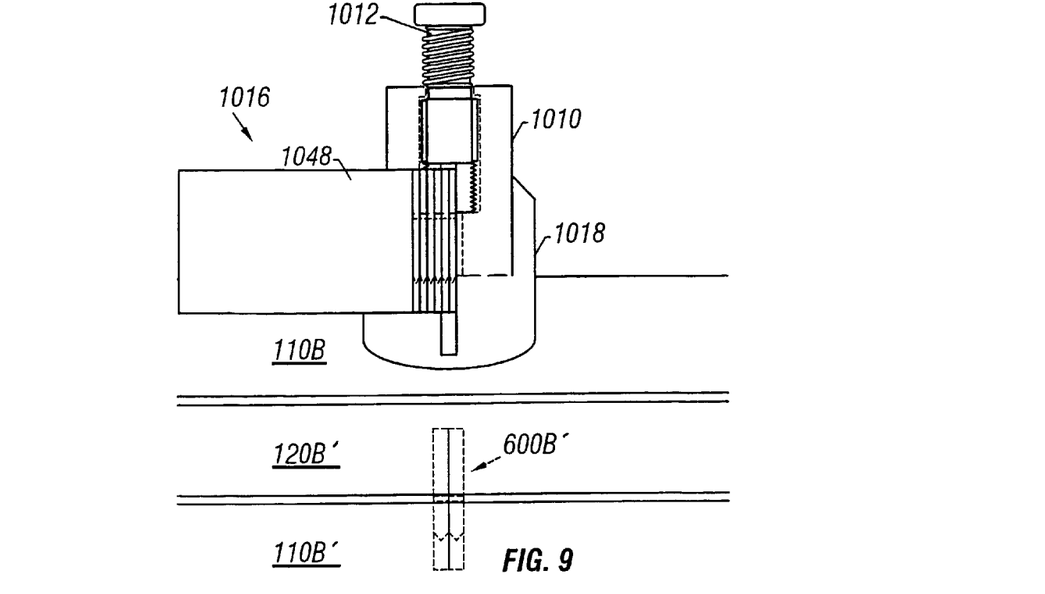
FIG. 9. is a top horizontal sectional view of a the driving device of FIG. 7, showing an alternate disposition of the magazine.

Referring to FIGS. 7–9, there is shown a device for driving leveling fasteners into boards. The driving device has alignment structure 1010, driver 1012, and alignment plate 1018.

Alignment structure 1010 has abutment surface 1024 which is adapted to abut first board end surface 114B of first board 110B. Alignment structure 1010 defines fastener delivery channel 1044. Fastener 600B is positioned within fastener delivery channel 1044. When abutment surface 1024 is positioned against board end surface 114B, first support surface 614B is flush against first board contact surface 112B and pointed prongs 620B are directed toward board end surface 114B, so that the device is positioned to drive pointed prongs 620B into board end surface 114B. Driver 1012 has striking portion 1050 with broadened striking head 1052, stock 1054, and driving portion 1056. Driver 1012 is slidably and movably fitted within fastener delivery channel 1044. Driver 1012 is capable of moving toward abutment surface 1024, in response to an external force, for example a hammer blow on striking head 1052. Such movement causes driving portion 1056 to move down fastener delivery channel and to contact connecting portion 616B, in order to move leveling fastener 600B from a first position to a second position, thus driving pointed prongs 620B into board end surface 114B.

The driving device has two internal springs 1068 disposed within driving channel 1062 so that, when driver 1012 is driven forward, internal springs 1068 are compressed between stock 1054 of driver 1012 and compression surface 1070 that bounds driving channel 1062 within alignment structure 1010. After the forward motion of driver 1012 ceases, internal springs 1068 expand, so as to push driver 1012 back to its initial position. External springs 1072, connected between striking head 1052 and alignment structure 1010, may be used alternately or in conjunction with internal springs 1068, in order to return driver 1012 to its initial position, when the driving motion is completed.

Alignment plate 1018 is fastened to alignment structure 1010 so that it can abut first board contact surface 112B. Alignment plate 1018 defines alignment cutout 1071, which provides clearance for support member 610B of leveling fastener 600B, so that support surface 613B can remain flush against first contact surface 112B, while pointed prongs 620B are driven forward into board end surface 114B by driver 1012 as it progresses down fastener delivery channel 1044.

Magazine 1016, which holds a plurality of leveling fasteners for subsequent delivery to fastener delivery channel 1044, is fitted partially within alignment structure 1010. Magazine 1016 defines fastener supply channel 1048 which joins fastener delivery channel 1044, so that fasteners which are retained within supply channel 1048 may pass into fastener delivery channel 1044. FIGS. 8 and 9 show alternative dispositions of magazine 1016. In FIG. 8, magazine 1016 is connected to the top of alignment structure 1010, so that the leveling fasteners are stored vertically. In FIG. 9, magazine 1016 is connected to a side of alignment structure, so that the fasteners are stored horizontally.

FIG. 9 also shows the connection of boards 110B', 120B' by leveling fastener 600B' (in phantom).

Figure 10:
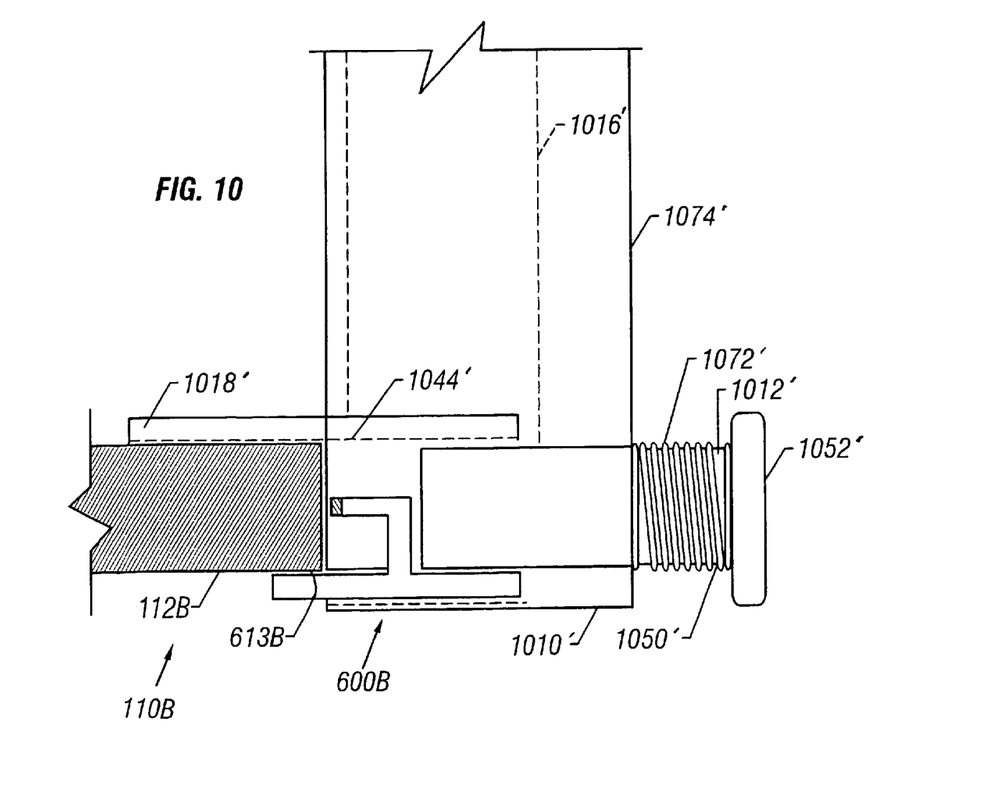
FIG. 10 is a side vertical sectional view of an alternate driving device.

Referring to FIG. 10, there is shown an alternate configuration of the driving device, in which first support surface 613B of leveling fastener 600B is flush against first contact surface 112B of first board 110B and alignment plate 1018' abuts opposing board surface 116B. The position of alignment plate 1018' relative to alignment structure may be adjusted on adjustment member 1074', so that first support surface 613B may be flush against first contact surface 112B, for any thickness of board 110B. Adjustment member 1074' may also include magazine 1016' for holding a plurality of leveling fasteners.

Leveling fasteners may be made from a variety of different materials and in a variety of configurations. Making leveling fasteners from stamping metal allows for efficient and inexpensive manufacturing. Designs in which the cut metal has been folded also gives additional thickness, rigidity, and strength to the fasteners. Preferably, 13 gauge metal is used, however either heavier or lighter materials may also be used, depending on the intended purpose of the leveling fastener.

Figure 11:
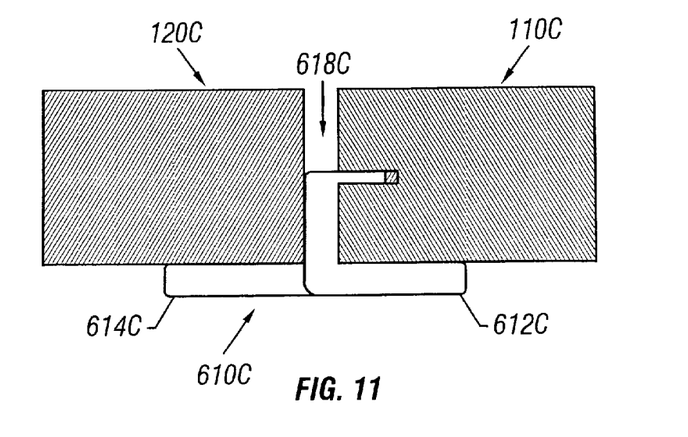
FIG. 11 is a side view of a leveling fastener connecting two boards.
Figure 12:
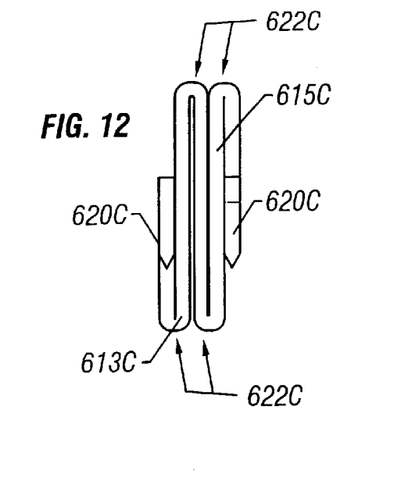
FIG. 12 is a top view of the leveling fastener of FIG. 11.

Referring to FIGS. 11–12, there is shown a leveling fastener that is made from thinner 16 gauge metal, which has been folded laterally along folds 622C, in order to create broad support surfaces 613C, 615C on support portions 612C, 614C. In addition to breadth of support surfaces 613C, 615C, multiple folds provide additional strength and rigidity, which is helpful when thinner materials, such as 16 gauge wire, are used. In FIG. 11, boards 110C, 120C are set in alignment against support portions 612C and 614C, respectively, and prong 620C has been driven into board 110C.

Figure 13:
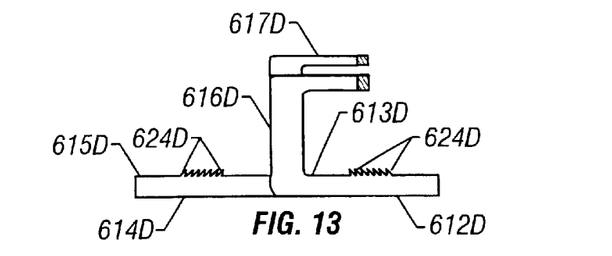
FIG. 13 is a side view of a leveling fastener.

Referring to FIG. 13, there is shown a leveling fastener similar to that in FIGS. 11–12, however the embodiment of FIG. 13 has barbs 624D on support surfaces 613D, 615D of first and second support portions 612D, 614D. Barbs 624D allow support surfaces 613D, 615D to grip boards more strongly. Any part of the leveling fasteners can have a rough surface, for example a surface that is jagged, grooved, or barbed, which permits the fasteners to have a more secure connection to boards. Further, connecting portions 616D and 617D have different lengths.

Figure 14:
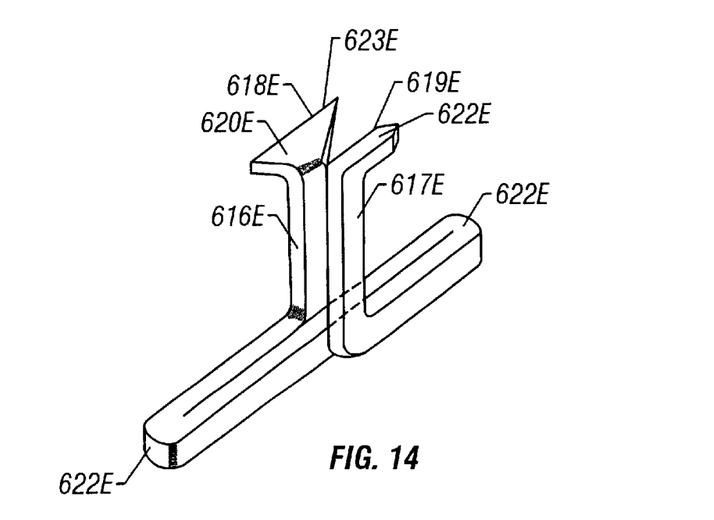
FIG. 14 is a perspective view of a leveling fastener.
Figure 15:
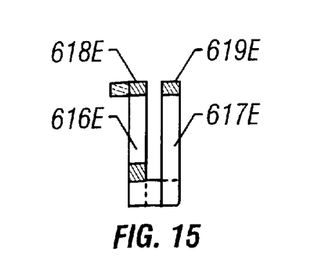
FIG. 15 is a front view of the leveling fastener of FIG. 14.
Figure 16:
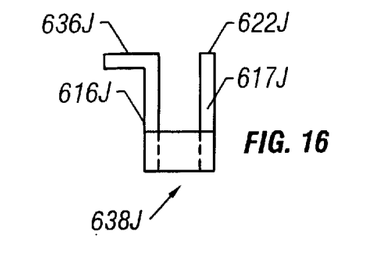
FIG. 16 is a front view of a leveling fastener.
Figure 17:
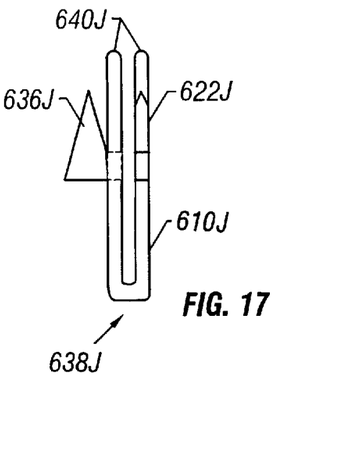
FIG. 17 is a top view of the leveling fastener of FIG. 16.

Leveling fasteners may employ multiple fastening components and combine different types of fastening components, for example pointed prongs and flat protrusions. Thus, referring to FIGS. 14–15, there is shown a leveling fastener made of metal that is folded laterally along folds 622E. This embodiment has first and second connecting members 616E, 617E, and first and second fastening components 618E, 619E. First fastening component 618E has first forward-facing pointed prong 620E and second rearward-facing pointed prong 623E. Second fastening component 619E has a first rearward-facing pointed prong 622F. Referring to FIGS. 16–17, there is shown a leveling fastener having rearward-facing flat triangular fastening component 636J and rearward-facing pointed prong 622J. Support member 610J has been bent into an elongated U-shape at end fold 638J, so that individual support elements 640J are spaced apart, thereby creating effectively a broad support member 610J.

Figure 18:
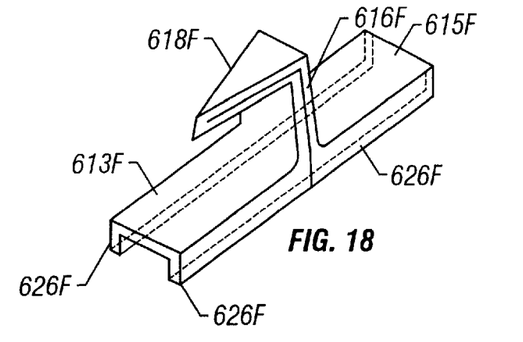
FIG. 18 is a perspective view of a leveling fastener.
Figures 19, 20, 21, 22:
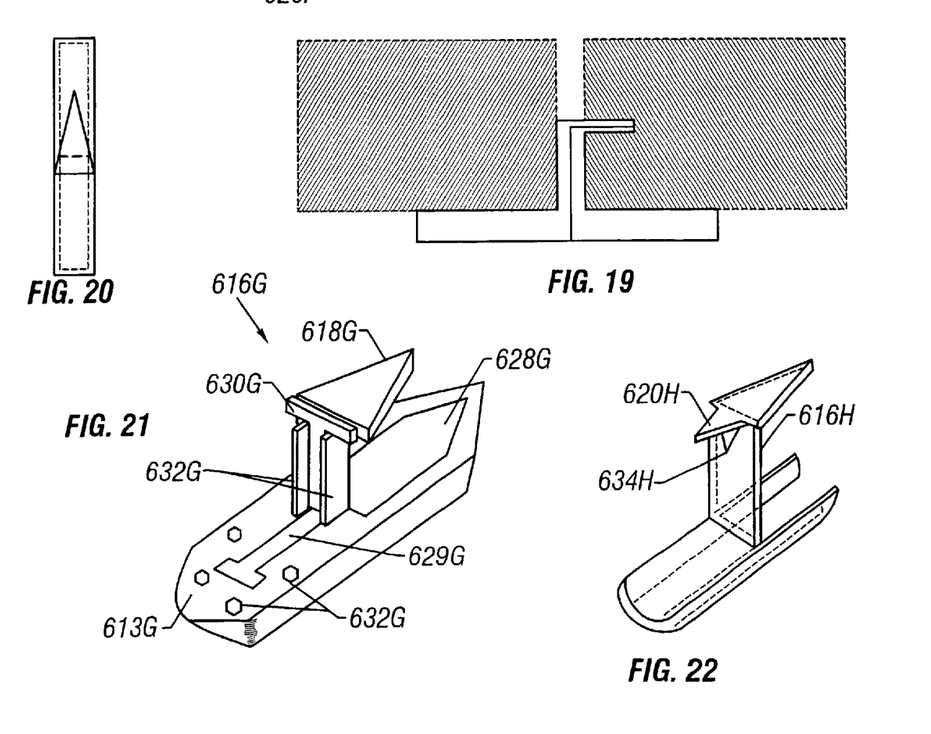
FIG. 19 is a side view of the leveling fastener of FIG. 18 connecting two boards.
FIG. 20 is a tope view of the leveling fastener of FIG. 18.
FIG. 21 is a perspective view of a leveling fastener.
FIG. 22 is a perspective view of a leveling fastener.

Referring to FIGS. 18–22, there are shown additional varieties of leveling fasteners made from sheets of stamping metal. The embodiment shown in FIGS. 18–20 is doubled in thickness at connecting portion 616F and fastening component 618F, thus enhancing the strength and rigidity of these elements. Lateral panels 626F are folded downwardly away from support surfaces 613F, 615F, thereby providing additional rigidity and strength. The embodiment of FIG. 21 is made from stamping metal that has been cut and bent, so that connecting portion 616G and fastening component 618G are formed by bending metal pieces upward, leaving first and second cutouts 628G, 629G on support member 610G. T-shaped support 630G and tabs 632G provide additional strength and rigidity to connecting portion 616G. Support member 610G defines punched holes 632G punched there through. Punching roughens support surface 613G, in the vicinity of holes 632G, so that it can grip boards more strongly.

The embodiment of FIG. 22 is made from stamping metal that has been cut and bent, so that forward-facing prong 620H is bent away from connecting portion 616H, which thereby defines prong cutout 634H.

A number of embodiments of the invention have been described. Nevertheless, it will be understood that various modifications may be made without departing from the spirit and scope of the invention. For example, magazine 1016 may be orientated at any suitable angle relative to alignment structure 1010. Accordingly, other embodiments are within the scope of the following claims.

What is claimed is:

1. A leveling fastener, for connecting to a first board in order to provide leveling alignment with a second board, comprising an elongated support member having first and second support portions, said support portions having coplanar, respective, first and second upper surfaces, said first and second upper surfaces being coplanar over substantially their entire surfaces, a connecting portion extending upward from said elongated support member between said support portions, and an elongated first fastening component extending from said connecting portion in a first direction, generally parallel to said upper surfaces of said support portions, said first fastening component having a first pointed end, said first pointed end being aligned with said first support portion, said first support portion extending beyond said first pointed end, whereby said device can be secured to the first board solely by driving said first pointed end into a first board, and can provide support for said first board on said first upper surface and for a second board on said second upper surface, said elongated support remember being the lowest part of said fastener.

2. The board leveling fastener of claim 1, for connecting to the first board and to said second board, further comprising an elongated second fastening component extending from said connecting portion in a second direction, generally parallel to said upper surfaces of said support portions, said second fastening component having a second pointed end, whereby said device can be secured to the second board solely by driving said second pointed end into the second board.

3. The board leveling fastener of claim 2 wherein said second direction differs from said first direction by approximately 180°.

4. The board leveling fastener of claim 1 wherein said coplanar upper surfaces are rough, so as to provide additional gripping.

5. The board leveling fastener of claim 4 wherein said rough coplanar upper surfaces further comprise barbs.

6. The board leveling fastener of claim 1 wherein said elongated first fastening component has an outer surface that is rough, so as to provide additional gripping.

7. The board leveling fastener of claim 6 wherein said outer surface of said elongated first fastening component is barbed.

8. The board leveling fastener of claim 1 that is made from a sheet of stamping metal that has been cut and bent.

9. A method for leveling deck boards at unsupported portions of said boards in order to align said boards comprising:

providing a first board, having a first contact surface and a first end surface at an unsupported portion thereof, providing a leveling fastener with an elongated support member having first and second support portions, said support portions having coplanar, respective, first and second upper surfaces, said first and second upper surfaces being coplanar over substantially their entire surfaces, said leveling fastener also having a connecting portion, extending upward from said elongated support member between said support portions, and an elongated first fastening component extending from said connecting portion in a first direction, generally parallel to said upper surfaces of said support portions, said first fastening component having a first pointed end, said first pointed end being aligned with said first support portion, said first support portion extending beyond said first pointed end, said elongated support member being the lowest part of said fastener;

aligning said first board, by placing said first contact surface of said first board against said first support portion;

driving said first pointed end into said first side surface of said first board, so as to secure said leveling fastener to said first board;

providing a second board having a second contact surface and a second end surface at an unsupported portion thereof; and placing said second contact surface of said second board flush against said second support portion, thereby aligning said second board so that said first and second contact surfaces are approximately parallel to each other.

10. The method of claim 9 wherein said leveling fastener further comprises a second pointed end and said method further comprises the step of driving said second pointed end into said second end surface.

11. The combination comprising:

a fastener driving device comprising an alignment structure having a substantially flat abutment surface on its exterior, said alignment structure defining a fastener delivery channel, a driver slidably and movably connected to said alignment structure; and a leveling fastener located within said fastener delivery channel, said leveling fastener comprising an elongated support member having first and second support portions, said support portions having coplanar first and second upper surfaces, a connecting portion extending upward from said elongated support member between said support portions, and an elongated first fastening component extending from said connecting portion in a first direction, generally parallel to said upper surfaces of said support portions, said first fastening component having a first pointed end, whereby said fastener can be contacted by said driver and moved from a first position to a second position, by the movement of said driver down said fastener delivery channel.

12. The combination of claim 11, further comprising an alignment plate connected to said alignment structure, said alignment plate having an alignment surface.

13. The combination of claim 12 wherein said leveling fastener is situated within said fastener delivery channel so that said first upper surface of said first support portion is approximately coplanar with said alignment surface of said alignment plate.

14. The combination of claim 13 wherein said alignment plate defines a cutout and said leveling fastener is situated within said fastener delivery channel so that said first support portion can slide within said cutout, when said driver moves down said fastener delivery channel.

15. The combination of claim 11 wherein said first direction is generally away from said driver.

16. The combination of claim 15, further comprising an elongated second fastening component, said second fastening component extending from said connecting portion generally parallel to said upper surfaces of said support portions, said second fastening component having a second pointed end.

17. The combination of claim 16 wherein said second fastening component extends from said connecting portion in a second direction.

18. The combination of claim 16 wherein said second direction differs from said first direction by approximately 180°.

19. The combination of claim 12 wherein said alignment plate is adjustably connected to said alignment structure.

* * * * *